INVENTORS
GORDON W. DAVID
AND THOMAS A. GREEN
BY
*John F. Luhrs*
ATTORNEY

May 12, 1964  G. W. DAVID ETAL  3,132,670
FLOW NOZZLE
Filed June 26, 1962  2 Sheets-Sheet 2

INVENTORS
GORDON W. DAVID
AND THOMAS A. GREEN
BY
ATTORNEY

United States Patent Office 3,132,670
Patented May 12, 1964

3,132,670
FLOW NOZZLE
Gordon W. David, Euclid, and Thomas A. Green, Willoughby, Ohio, assignors to Bailey Meter Company, a corporation of Delaware
Filed June 26, 1962, Ser. No. 205,241
4 Claims. (Cl. 138—40)

This invention relates to an improved flow nozzle which can be fixed by welding between sections of pipe.

The invention is disclosed in connection with a stainless steel flow nozzle for welding between sections of high pressure carbon steel pipe. In high pressure piping such as encountered in modern industrial plants, pressures and temperatures may be encountered as high 5000 p.s.i. and 1200° F. As a result, only welded pipe connections have been found satisfactory.

Even in the case of welded connections, however, precautions must be taken to prevent the creation of residual stresses which might weaken the welds and to prevent the creation of brittle low strength areas where it is necessary to join metals of different composition. Costly welding and manufacturing techniques have been used in the past to insure satisfactory mounting of a stainless steel flow nozzle within a pipe which may be fabricated of carbon steel, carbon-Moly steel with or without a small percentage of chromium. In some instances special carbon steel welding rings have been separately machined and attached to the nozzle at the factory so that the nozzle can be subsequently supported and welded between pipe sections. In other instances the nozzle is merely mounted between two pipe sections and fixed by the weld joining the pipe sections. In the latter case, since the weld joins dissimilar metals, it is necessary to use a high cost process such as the Manual Shielded Arc Process to insure a satisfactory weld. On large diameter pipes a cost of several hundred dollars for making a single weld with this process is not unusual.

It is an object of the invention to provide an improved flow nozzle.

Another object of the invention is to provide a method of manufacturing a stainless steel flow nozzle which can be easily supported between adjacent sections of carbon steel or low alloy steel pipe utilizing conventional low cost automatic pipe welding methods.

Other objects and advantages will become apparent from the following description taken in connection with the accompanying drawings wherein.

Figure 1:
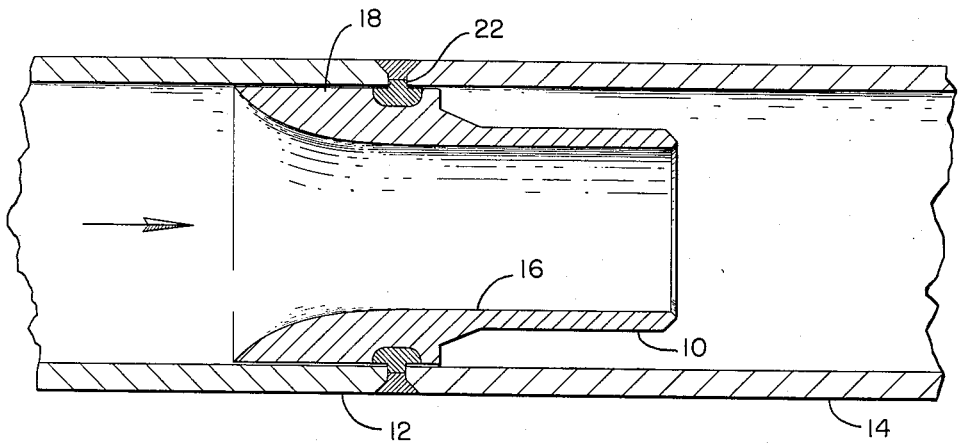
FIG. 1 is a longitudinal sectional view of a flow nozzle embodying the invention welded in position within a piping system.

Referring now to FIG. 1 of the drawings, there is shown a flow nozzle 10 position internally of a pipe and supported between the ends of two pipe sections 12 and 14. Flow nozzle 10 is of a well known configuration having a central Venturi flow passage 16 and a cylindrical surface 18 slightly smaller in diameter than the inside diameter of the pipe to permit nozzle 10 to be received in the ends of the pipe sections 12 and 14 as shown.

In accordance with the invention the nozzle 10 is provided with an integral peripheral welding shoulder 22 extending from surface 18 and adapted to be engaged by the beveled ends of pipe sections 12 and 14 as shown in FIG. 1. When the two pipe sections are joined by welding the shoulder 22 is simultaneously welded to the ends of pipe sections 12 and 14 to fix the position of the flow nozzle 10.

Generally for design and cost considerations the flow nozzle 10 is formed from a material such as stainless steel, and the pipe sections 12 and 14 formed from a low alloy or carbon steel material. For purposes of illustration assume the sections 12 and 14 are sections of standard commercially available high pressure carbon steel pipe while the flow nozzle 10 is formed from a material such as type 304 austenitic stainless steel containing approximately 18% chromium and 8% nickel. As is well known to those skilled in the art these two metals are normally non-compatible for welding without the use of manual welding processes and/or post heat treating. For example, with the structure illustrated in FIG. 1 if the welding shoulder 22 comprised type 304 austenitic stainless steel, a high cost welding process such as the Manual Shielded Arc Process utilizing a type 310 welding rod would be required to insure a ductile weld between the two pipe sections. If a low cost automatic welding process such as the Submerged Arc Process utilizing a carbon steel rod were used to join the two pipe sections 12 and 14 and the nozzle 10, a zone of martensitic steel would be produced at the root of the weld and thus cause a brittle zone which could not be softened by heat treating. Thus only a high cost manual welding process will insure a ductile weld between dissimilar metals such as austenitic stainless steel and low alloy or carbon steel.

To overcome the aforementioned limitation, the welding shoulder 22 is novelly formed from a carbon steel material compatible for welding to the carbon steel pipe sections 12 and 14 by conventional low cost automatic pipe welding processes. In general during manufacture carbon steel material is deposited in a recess on the surface 18 and machined to establish the welding shoulder 22. Thus, the stainless steel nozzle 10 is provided with an integral carbon steel welding shoulder 22 for welding to the carbon steel by conventional low cost automatic welding processes.

Figure 2:
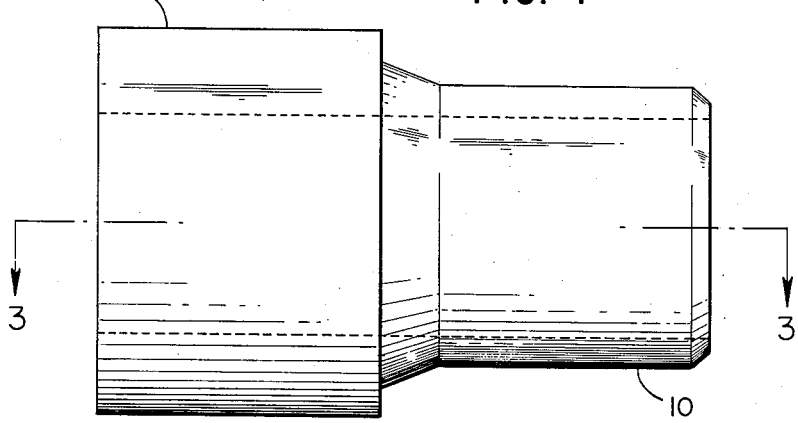
FIG. 2 is a longitudinal view of the flow nozzle shown in FIG. 1 in an early stage of manufacture.
Figure 3:
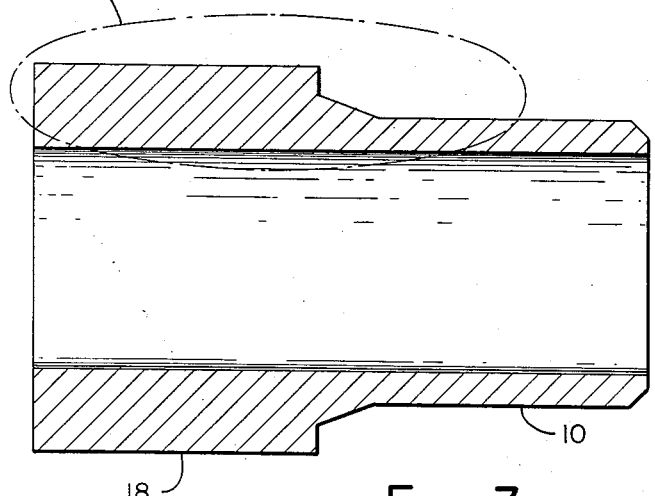
FIG. 3 is a sectional view taken along the line 3—3 of FIG. 2.

Referring now to the method of fabricating the flow nozzle 10 reference is made to FIGS. 2–7 which illustrate the various configurations of the nozzle as a result of various steps in the manufacture thereof. In FIGS. 2 and 3 we show the nozzle 10 machined to its approximate exterior configuration and provided with an initial rough cylindrical bore which is subsequently machined to form the Venturi flow orifice 16. This initial configuration may be produced by machining stock material in a manner well known to those skilled in the art.

Figure 4:
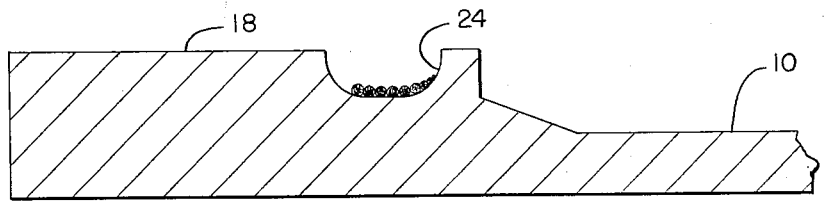
FIGS. 4, 5, 6 and 7 are enlarged details of area A of FIG. 3 showing sequential steps in the manufacture and installation of the flow nozzle.

Referring now specifically to FIG. 4 of the drawings, the structure illustrated in FIGS. 2 and 3 is provided with a suitable peripheral recess 24 in the surface 18 through a suitable machining operation. The dimensions of the recess 24 are preferably sufficient to accommodate a deposit of carbon steel weld material comprising a series of layers gradually decreasing in chromium and nickel composition to pure carbon steel at line (*c*).

After machining the recess 24, the nozzle 10 is rotated about its longitudinal axis in a suitable fixture and successive layers of carbon steel material are deposited in the recess 24 by welding during rotation. While various welding processes can be utilized to create such a deposit of weld material in the recess 24, we have found the Metallic-Inert-Gas Shielded Arc Process to be particularly desirable in that cleaning of the weld surface between successive layers of weld material is not necessary. Good results have been achieved utilizing a carbon steel welding wire .032 inch in diameter.

FIG. 4 of the drawings also shows the first layer of weld material formed by the above process. The first layer contacts and melts the bottom surface of the recess 24 placing some of the chromium and nickel of the stainless steel into solution with the carbon steel material of the welding wire. As a result the first layer of weld contains chromium and nickel, but in lesser proportions than the base metal. The next layer of weld material in turn puts the first layer of weld material into solution and will contain some chromium and nickel, but less than the first layer. With each successive layer the amount of chromium and nickel will decrease until a layer of substantially pure carbon steel is obtained. Thus, the upper portion of the deposit will be pure carbon steel and compatible for welding to the carbon steel pipe sections 12 and 14.

Figure 5:
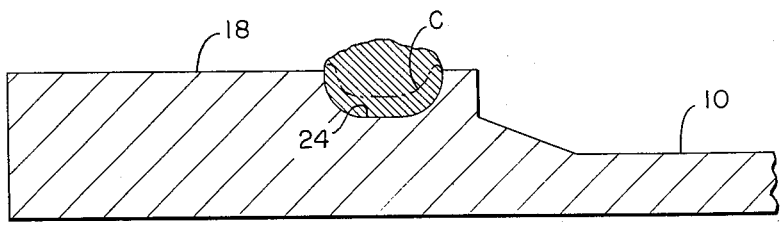

FIG. 5 of the drawings illustrates the cross sectional configuration of the weld deposit following the welding operation. The area above the dotted line (c) is pure carbon steel while the area below contains chromium and nickel, the percentage of which depends on the distance from the surfaces of the recess 24.

While the cross sectional configuration of the recess 24 is not critical, good results have been obtained with the configuration shown in FIG. 4 and a width at the surface of $11/16$ inch and a depth of $1/4$ inch. Preferably the recess is generally rounded as shown to facilitate the welding operation.

Figure 6:
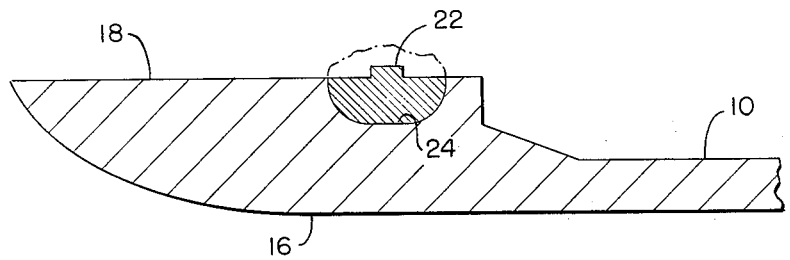

After depositing of the weld material in recess 24 the surface 18 and weld deposit are machined to produce the final exterior configuration and finish of the flow nozzle 10 illustrated in FIG. 6. Also the cylindrical bore 23 is machined to establish the final configuration of the flow nozzle to complete the manufacturing process. The end product appears to the observer as comprising a single integral part with the carbon steel portion of the nozzle 10 being substantially undetectable.

Figure 7:
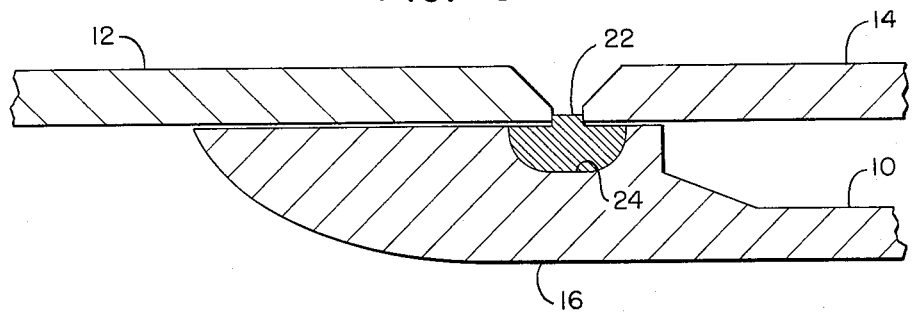

In FIG. 7 we have illustrated the shoulder 22 in position between the ends of pipe sections 12 and 14 prior to welding of the pipe sections. It will be apparent that all surfaces adjacent the space to be filled with weld comprise carbon steel surfaces compatible for welding. By means of a low-cost process such as the Submerged Arc automatic process the three parts may be satisfactorily welded together using an ordinary carbon steel welding rod to fix the position of the nozzle 10 and simultaneously join the two pipe sections 12 and 14.

It has been found that any residual stresses created during deposit of the carbon steel welding material in the recess 24 are sufficiently relieved by the heat produced during the subsequent welding of the flow nozzle 10 into position within the pipe sections 12 and 14. Thus, it has been found unnecessary to post heat treat the flow nozzle 10.

It will be thus apparent that the flow nozzle described substantially eliminates the welding problems connected with installation of prior art devices and thus accomplishes the objects of the invention. It will also be apparent that many changes may be made in the disclosed method and apparatus without departing from the scope of the invention as defined in the appended claims.

It is claimed and desired to secure by Letters Patent of the United States:

1. A flow nozzle of a first metallic composition adapted to be welded within a conduit of a second metallic composition comprising, a generally hollow cylindrical base structure of the first metallic composition having a nozzle orifice formed therein and having an integral peripheral shoulder of the second metallic composition formed by depositing welding material of the second metallic composition on the surface of said base structure, said shoulder being shaped for welding to the conduit to support said base structure within the conduit.

2. A flow nozzle as claimed in claim 1 wherein said base structure is formed from stainless steel for use in a carbon steel conduit, said shoulder being of carbon steel composition and formed by depositing weld material on the surface of said base structure.

3. A flow nozzle having a first metallic composition adapted to be welded between pipe sections having a second metallic composition comprising, a generally cylindrical base structure having the first metallic composition and having a nozzle orifice formed therein, a peripheral recess in the surface of said base structure, and material of the second metallic composition filling said recess to define an integral portion of the second metallic composition compatible for welding to the pipe sections.

4. A flow nozzle having a first metallic composition adapted to be welded between pipe sections having a second metallic composition comprising, a generally cylindrical base structure of the first metallic composition and having a nozzle orifice formed therein, a recess in the peripheral surface of said base structure, and material of the second metallic composition deposited in said recess by welding to define a peripheral shoulder adapted to be engaged by the ends of the pipe sections to be fixed thereto upon joining of the pipe sections by welding.

References Cited in the file of this patent

UNITED STATES PATENTS

| 1,298,471 | Dodge | Mar. 25, 1919 |
| 1,298,532 | Mapelsden | Mar. 25, 1919 |
| 1,352,292 | Lord | Sept. 7, 1920 |
| 1,559,155 | Bullock | Oct. 27, 1925 |
| 1,739,161 | McKee | Dec. 10, 1929 |
| 1,802,766 | Kerr | Apr. 28, 1931 |

OTHER REFERENCES

Heating, Piping and Air Conditioning, publication (page 134, 1 sheet of dwg. and printed matter). (Copy in Group 360.)